Figure 1:
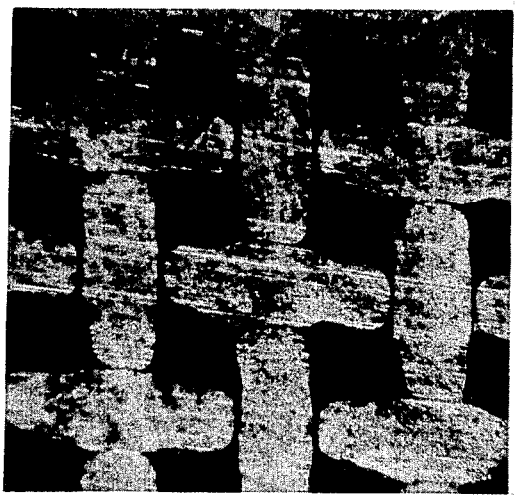

United States Patent [19]

Darrow et al.

[11] 4,091,146

[45] May 23, 1978

[54] FLEXIBLE, LOW POROSITY AIRFOIL SKIN

[75] Inventors: Kenneth A. Darrow, Sprakers; Daniel P. Smith, Ballston Spa, both of N.Y.

[73] Assignee: General Electric Company, Schenectady, N.Y.

[21] Appl. No.: 793,921

[22] Filed: May 5, 1977

Related U.S. Application Data

[63] Continuation-in-part of Ser. No. 618,458, Oct. 1, 1975, abandoned.

[51] Int. Cl.² .............................................. B32B 15/18
[52] U.S. Cl. .............................. 428/594; 148/11.5 Q; 148/12 R; 416/230; 416/241 R; 428/604; 428/636; 428/680; 428/683
[58] Field of Search ................ 148/11.5 Q, 12 R, 127; 428/594, 604, 636, 678, 683, 680; 416/241 R, 230

[56] References Cited

U.S. PATENT DOCUMENTS

| | | | |
|---|---|---|---|
| 2,641,439 | 6/1953 | Williams | 416/241 R |
| 3,153,279 | 10/1964 | Chessin | 29/420 |
| 3,402,914 | 9/1968 | Kump et al. | 416/241 R |
| 3,680,183 | 8/1972 | Sundberg et al. | 29/163.5 |
| 3,759,708 | 9/1973 | Sundberg et al. | 75/208 R |

*Primary Examiner*—Arthur J. Steiner
*Attorney, Agent, or Firm*—Paul R. Webb, II; Joseph T. Cohen; Jerome C. Squillaro

[57] ABSTRACT

A flexible, low porosity airfoil skin is described which includes multilayer flexible, annealed metallic mesh members consisting of two or three such members selected from the class consisting of nickel, Monel alloy, and stainless steel, the members having a mesh size from 60 to 100, the members interlocked mechanically, and the skin having a thickness reduction in the range from 2.5 to 3.0. Such a flexible, low porosity airfoil skin is useful as a covering structure and is particularly useful as a skin or as a substrate for a cooled non-linear airfoil-shaped body, such as a turbine or compressor blade.

6 Claims, 2 Drawing Figures

FLEXIBLE, LOW POROSITY AIRFOIL SKIN

This application is a continuation-in-part of application Ser. No. 618,458 filed Oct. 1, 1975, now abandoned.

This invention relates to an improved flexible, low porosity airfoil skin and, more particularly, to such a skin exhibiting flexibility and stretchability.

Such a flexible, low porosity airfoil skin is useful as a covering structure and is particularly useful as a skin or as a substrate for a cooled non-linear airfoil-shaped body, such as a turbine or compressor blade.

Transpiration cooled blades are disclosed, for example, in Kump et al. U.S. Pat. No. 3,402,914 issued Sept. 24, 1968. In the subject patent as pointed out in column 4, lines 5 – 18, a sheath or skin of suitable porous material and of airfoil configuration encloses the strut member, being attached to the lands thereof by welding, bracing, or other conventional means. It is further pointed out in column 4, lines 46 – 48, that the skin on the convex side of the blade may have one or more areas of reduced porosity of varying degrees. It is further pointed out in column 3, lines 40 – 41, that in such a transpiration cooled blade the porous skin passes coolant equally throughout. As it is pointed out in column 4, lines 29 – 32, the porous sheath may be formed of a metal mesh member rolled and sintered.

In Williams U.S. Pat. No. 2,641,349 issued June 9, 1953 there is described a cooled turbine or compressor blade which has a non-porous double layer skin provided thereon.

Our present invention is directed to an improved flexible, low porosity airfoil skin which is substantially different from the above described patents in that a flexible, low porosity airfoil skin is provided which includes two or three flexible metallic mesh members such as screen or cloth which are interlocked mechanically, and the skin is reduced in a specific thickness range.

The primary objects of our invention are to provide an improved flexible, low porosity airfoil skin which is particularly useful as a skin or as a substrate for a cooled non-linear airfoil-shaped body, such as a turbine or compressor blade.

In accordance with one aspect of our invention, a flexible, low porosity airfoil skin comprises multilayer flexible annealed metallic mesh members consisting of two or three such members selected from the class consisting of nickel, Monel nickel-copper alloy and stainless steel, the members are interlocked mechanically, the members have a mesh size from 60 to 100, and the skin has a thickness reduction in the range from 2.5 to 3.0.

Figure 2:
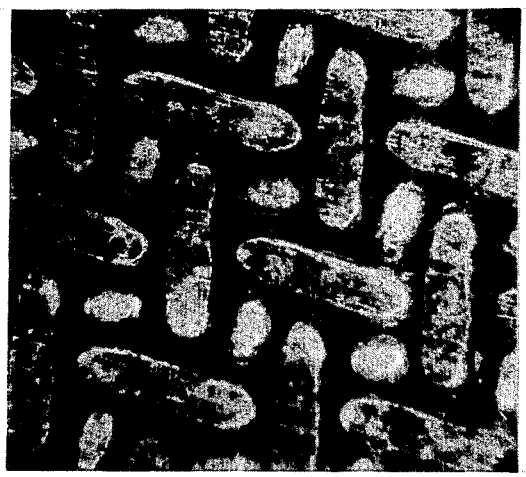

These and various other aspects, features and advantages of the invention will be better understood from the following description taken in connection with the accompanying drawing in which:

FIG. 1 is a photomicrograph of an 80 mesh nickel wire cloth calendered to 4 mils thick which was taken at approximately a 50 amplification; and FIG. 2 is a photomicrograph of a double layer of 80 mesh nickel screen wire calendered to 8 mils thick which was taken at approximately a 50 amplification. The second photomicrograph shows a flexible, low porosity airfoil skin made in accordance with our invention.

As it is shown in FIG. 1 of the drawing, a single layer of 80 mesh square weave nickel cloth was calendered from 12 mils to 4 mils. The reduction in the thickness did not appreciably reduce the pore size as it is shown in the figure. This structure would be of the type mentioned in column 4, lines 29 – 32, of the above identified Kump et al patent.

In FIG. 2 of the drawing, there is shown a flexible, low porosity airfoil skin embodying our invention which was formed in accordance with our invention by folding a single layer of 80 mesh nickel screen about 4 inches wide and 2 feet long double so that the wires of the two layers were approximately parallel to each other in the long direction. These two mesh members were mechanically interlocked by rolling in a conventional fashion. As a result, the wire of one layer was further crimped and forced into the pores of the opposite layer by rolling from 20 mils to 8 mils in thickness. After the two members were interlocked mechanically, the thickness reduction of the skin was 2.5. The resulting skin was of a high density and low pore size as is shown in the Figure. The skin was then annealed by firing at a temperature of 1000° C in dry hydrogen to remove any oxides and to anneal for maximum flexibility. After annealing, the flexible, low porosity airfoil skin retained much of its previous flexibility and stretchability.

Three flexible metallic mesh members, each of which was 80 mesh nickel screen having an initial thickness of 10 mils, were interlocked mechanically by rolling in a conventional fashion. In this manner the initial thicknes was reduced to a subsequent thickness of 12 mils resulting in a thickness reduction of 2.5. The skin was then annealed as described above to result in a flexible and low porosity airfoil skin.

We found that we could form a flexible, low porosity skin by providing two or three flexible metallic mesh members which were interlocked mechanically. The resulting skin was of reduced thickness in a range from 2.5 to 3.0. The skin was annealed to retain much of its previous flexibility. The skin had a low porosity. Such mesh members can be of material such as screen or cloth and selected from the class consisting of nickel, Monel alloy, and stainless steel. The members have a mesh size from 60 to 100. The skin has a thickness reduction in the range from 2.5 to 3.0. When two or three such members are formed into our flexible, low porosity airfoil, the resulting structure is stretchable and has low porosity. A single screen which is rolled and annealed as shown in FIG. 1 of the drawing fails to provide these advantages. If more than three such members are employed in an attempt to make a flexible, low porosity airfoil skin, the mechanical interlocking is mechanically difficult if not impossible and results in a product which loses its flexibility and stretchability.

We found that our flexible, low porosity airfoil skin is useful as a covering structure and is particularly useful as a skin or substrate for a cooled non-linear airfoil-shaped body, such as a turbine or compressor blade. A flexible, low porosity airfoil skin was formed by folding a single layer of 80 mesh nickel screen about 4 inches wide and 2 feet long double so that the wires of the two layers were approximately parallel to each other in the long direction. These two mesh members were mechanically interlocked by rolling in a conventional rolling mill. As a result, the wire of one layer was further crimped and forced into the pores of the opposite layer by rolling from an initial 20 mils to a final 8 mils in thickness. After the two members were interlocked mechanically, the thickness reduction of the skin was 2.5. The resulting skin was of a high density and low pore size. The skin was then annealed by firing at a temperature of 1000° C in dry hydrogen to remove any oxides and to anneal for maximum flexibility. After annealing, the flexible, low porosity airfoil skin retained much of its previous flexibility and stretchability.

Three flexible metallic mesh members, each of which was 80 mesh nickel screen having an initial thickness of 10 mils, were interlocked mechanically by rolling in a conventional rolling mill. In this manner the initial thickness was reduced to a subsequent thickness of 12 mils resulting in a thickness reduction of 2.5. The skin was then annealed by firing at a temperature of 1000° C in dry hydrogen to result in a flexible and low porosity airfoil skin.

While other modifications of the invention and variations thereof which may be employed within the scope of the invention have not been described, the invention is intended to include such as may be embraced within the following claims.

What we claim as new and desire to secure by Letters Patent of the United States is:

1. A flexible, low porosity airfoil skin comprising multilayer flexible, annealed metallic mesh members consisting of two or three such members, each member selected from the group consisting of nickel, nickel-copper alloys, and stainless steel, the members having a mesh size from 60 to 100, the members interlocked mechanically, said skin having been reduced in the range from 2.5 to 3.0, and thereafter annealed.

2. A flexible, low porosity airfoil skin as in claim 1, in which there are two members, each of the two members is 80 mesh nickel screen having an initial thickness of 10 mils, and the skin having a final thickness of 8 mils.

3. A flexible, low porosity airfoil skin as in claim 1, in which there are three members, each of the three members is 80 mesh nickel screen having an initial thickness of 10 mils, and the skin having a final thickness of 12 mils.

4. A method of forming a flexible, low porosity airfoil skin comprising providing multilayer flexible metallic mesh members consisting of two or three such members, selecting each member from the group consisting of nickel, nickel-copper alloys and stainless steel, providing members with a mesh size from 60 to 100, positioning the members together, interlocking the members mechanically, reducing the thickness of said skin in the range from 2.5 to 3.0 and annealing the skin.

5. A method of forming a flexible low porosity airfoil skin as in claim 4, in which there are two members, each of two members is 80 mesh nickel screen having an initial thickness of ten mils, the members are rolled together interlocking mechanically the members, reducing the initial thickness to eight mils, and annealing the low porosity skin in dry hydrogen.

6. A method of forming a flexible, low porosity airfoil skin as in claim 4, in which there are three members, each of the three members is 80 mesh nickel screen having an initial thickness of 10 mils, the members are rolled together interlocking mechanically the members, reducing the initial thickness to 12 mils, and annealing the low porosity skin in dry hydrogen.

* * * * *